United States Patent
Neumann et al.

(10) Patent No.: US 9,143,528 B2
(45) Date of Patent: Sep. 22, 2015

(54) METHOD AND DEVICE FOR COUNTERING FINGERPRINT FORGERY ATTACKS IN A COMMUNICATION SYSTEM

(71) Applicant: THOMSON LICENSING, Issy de Moulineaux (FR)

(72) Inventors: Christoph Neumann, Rennes (FR); Olivier Heen, Domloup (FR); Clementine Maurice, Rennes (FR); Stephane Onno, Saint Gregoire (FR)

(73) Assignee: Thomson Licensing, Issy-les-Moulineaux (FR)

( * ) Notice: Subject to any disclaimer, the term of this patent is extended or adjusted under 35 U.S.C. 154(b) by 0 days.

(21) Appl. No.: 13/920,464

(22) Filed: Jun. 18, 2013

(65) Prior Publication Data

US 2013/0347105 A1 Dec. 26, 2013

(30) Foreign Application Priority Data

Jun. 20, 2012 (EP) .................................... 12305701

(51) Int. Cl.
 *G06F 21/00* (2013.01)
 *H04L 29/06* (2006.01)
 *H04W 12/12* (2009.01)

(52) U.S. Cl.
 CPC ........ *H04L 63/1491* (2013.01); *H04L 63/1441* (2013.01); *H04W 12/12* (2013.01)

(58) Field of Classification Search
 USPC .................................. 726/22–24
 See application file for complete search history.

(56) References Cited

U.S. PATENT DOCUMENTS

| | | | |
|---|---|---|---|
| 2003/0135762 A1 | 7/2003 | Macaulay | |
| 2010/0077483 A1* | 3/2010 | Stolfo et al. | 726/24 |
| 2011/0138462 A1* | 6/2011 | Kim et al. | 726/22 |

FOREIGN PATENT DOCUMENTS

WO WO2012069544 5/2012

OTHER PUBLICATIONS

Brian M. Bowen et al: "Automating the Injection of Believable Decoys to Detect Snooping", WiSec 2010; Hoboken, New Jersey, USA, Mar. 24, 2010, pp. 1-6, Retrieved from the Internet.
Loh DCC et al: "Identifying Unique Devices through Wireless Fingerprinting", WISEC'08, Alexandria, Virginia, USA, Mar. 31, 2008, pp. 1-10, XP002669056.
C. Arackaparambil, S. Bratus, A. Shubina, and D. Kotz; fiOn the Reliability of Wireless Fingerprinting Using Clock Skewsfl. In Proceedings of ACM WiSec 10, Mar. 2010.
(Continued)

Primary Examiner — Ghazal Shehni
(74) Attorney, Agent, or Firm — Myers Wolin LLC

(57) ABSTRACT

A method and a fingerprinting device for countering fingerprint forgery in a communication system. The fingerprinting device obtains and stores a reference fingerprint for a client device, generates and transmits decoy traffic that appears to originate from the client device, the decoy traffic having different fingerprinting properties than real traffic from the client device, generates a fingerprint for non-decoy traffic purportedly from the client device, and compares the generated fingerprint with a reference fingerprint. A forged fingerprint is detected if there is a mismatch. The decoy traffic preferably comprises frames to which no response is needed. The invention is particularly suited for 802.11 using fingerprints based on duration fields of received frames and the decoy traffic is then preferably probe request frames and null data frames.

14 Claims, 2 Drawing Sheets

(56) References Cited

OTHER PUBLICATIONS

IEE 802.11 and defined in IEEE Std 802.11-1999 (hereinafter 802.11) Cited in First Filing Application.

J. Cache, fiFingerprinting 802.11 Implementations via Statistical Analysis of the Duration Fieldfl, 2006.

S. Jana and S. K. Kasera; FiOn Fast and Accurate Detection of Unauthorized Wireless Access Points Using Clock Skewsfl, In Proceedings of ACM MobiCom 08, Sep. 2008.

Search Report Dated Dec. 17, 2012.

Chakravarty et al., "Detecting Traffic Snooping in Anonymity Networks Using Decoys", 14th International Symposium on Recent Advances in Intrusion Detection, Menlo Park, California, USA, Sep. 20, 2011, pp. 1-17.

Francois et al., "PTF: Passive Temporal Fingerprinting", 12th IFIP/IEEE International Symposium on Integrated Network Management (IM 2011) Nov. 27, 2011, pp. 1-8.

Nguyen et al., "Device Fingerprinting to Enhance Wireless Security using Nonparametric Bayesian Method", 30th IEEE International Conference on Computer Communications, Shanghai, China, Apr. 10, 2011, pp. 1-9.

Gao et al., "A Passive Approach to Wireless Device Fingerprinting", 2010 IEEE/IFIP International Conference on Dependable Systems & Networks (DSN), Chicago, Illinois, USA, Jun. 28, 2010, pp. 383-392.

Prigent et al., "IPMORPH", Presentation at 2009 Symposium on the Security of Information Technology, Rennes, France, Jun. 5, 2009, pp. 1.

Prigent et al., "IpMorph: fingerprinting spoofing unification", Journal in Computer Virology, Nov. 2010, vol. 6, No. 4, pp. 329-342.

Roualland et al., "IP Personality", http://ippersonality.sourceforge.net/, Apr. 24, 2012, pp. 1.

Castelluccia, et al., "Shake Them Up! A movement-based pairing protocol for CPU-constrained devices", 3rd International Conference on Mobile Systems, Applications and Services, Seattle, Washington, USA, Jun. 6, 2005, pp. 1-26.

\* cited by examiner

METHOD AND DEVICE FOR COUNTERING FINGERPRINT FORGERY ATTACKS IN A COMMUNICATION SYSTEM

This application claims the benefit, under 35 U.S.C. §119 of European Patent Application 12305701.0, filed Jun. 20, 2012.

TECHNICAL FIELD

The present invention relates generally to device fingerprinting and in particular to countermeasures against fingerprint forgery attacks.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

For the purposes of the present invention device fingerprinting means gathering information about a device in order to characterize it. This process yields a signature, also called fingerprint, which describes one or more of the device's observed features in a compact form. If the generated signature is distinctive enough, it may be used to identify the device.

The description will be focused on fingerprinting devices that implement the standard for wireless communication called IEEE Standard for Information technology—Telecommunications and information exchange between systems—Local and metropolitan area networks—Specific requirements Part 11: Wireless LAN Medium Access Control (MAC) and Physical Layer (PHY) Specifications; for short called IEEE 802.11 and defined in IEEE Std 802.11-1999 (hereinafter 802.11). This standard is for example used by WiFi. It will however be appreciated that the invention may also be used to fingerprint devices that implement other suitable wireless communication techniques, such as for example ALOHA or Zigbee, or indeed wired communication techniques, such as for example Ethernet based protocols.

As already mentioned, device fingerprinting enables identification of devices, an identification that is independent of the purported identity of the device. A primary application of 802.11 device fingerprinting is the detection of Media Access Control (MAC) address spoofing. This refers to the action of usurping the MAC address of another device in order to benefit from its authorization.

In several scenarios, the detection of MAC address spoofing is of importance: Open wireless networks such as hotspots often implement MAC address based access control in order to guarantee that only legitimate client stations (e.g. the devices that has purchased Internet access) connect to the access points. More controlled wireless networks such as site enterprise networks also often implement forms of MAC address based access control, as a supplement to cryptographic access control for instance. Attackers may then want to steal a legitimate device's session by spoofing the latter's MAC address. Conversely, the access points (APs) may be subject to attacks:

tools like AirSnarf and RawFakeAP enable an attacker to set up a rogue access point, which could make client stations connect to the fake AP instead of the genuine one. A good fingerprinting method should be able to detect above attacks so that countermeasures may be taken.

The prior art comprises a number of solutions for fingerprinting wireless devices by analyzing implementation specificities of the network card and/or driver. See for example WO 2012/069544; J. Cache, "Fingerprinting 802.11 Implementations via Statistical Analysis of the Duration Field", 2006; S. Jana and S. K. Kasera; "On Fast and Accurate Detection of Unauthorized Wireless Access Points Using Clock Skews", In *Proceedings of ACM MobiCom* 08, September 2008; C. Arackaparambil, S. Bratus, A. Shubina, and D. Kotz; "On the Reliability of Wireless Fingerprinting Using Clock Skews", In *Proceedings of ACM WiSec* 10, March 2010. It should be noted that the methods of Jana et al. and Arackaparambil et al. are only applicable to access points as they require the timestamps included in the 802.11 beacon frames which are only sent by access points and not by client stations.

However, it is also possible for an attacker to try to forge the fingerprint of a further device (called 'victim'). Forging a signature generally requires two steps: 1) analysis of the network traffic characteristics of the victim, and 2) reproduction of network traffic with similar characteristics in order to fool the verifier. In a network with a broadcast channel, the attacker can easily access the network traffic of the victim, which simplifies the first step of the attack, while the generalization of software network interfaces or software radios simplifies the second step of the attack.

It will therefore be appreciated that there is a need for a solution that can prevent an attacker from forging the fingerprint of a victim. The present invention provides such a solution.

SUMMARY OF INVENTION

In a first aspect, the invention is directed to a device for countering fingerprint forgery attacks in a communication network. The device comprises an interface configured to receive network traffic from a plurality of devices in the communication network and to send decoy traffic in the communication network. The device further comprises a processor configured to generate a fingerprint for a protected device from received network traffic purportedly coming from the protected device; compare the generated fingerprint with a reference fingerprint comprising for the protected device to determine if the fingerprint is forged or not, the reference fingerprint comprising a plurality of features; and generate the decoy traffic that appears to originate from the protected device, wherein the decoy traffic comprises at least one frame having a feature that is different from the features of the reference fingerprint.

In a first preferred embodiment, the processor is further adapted to detect a frame replay upon reception of a frame having a feature that is different from the features of the reference fingerprint.

In a second preferred embodiment, the processor is further adapted to disregard the decoy traffic when generating a fingerprint for the protected device.

In a third preferred embodiment, the decoy traffic comprises the network address of the device as originating address.

In a fourth preferred embodiment, the processor is further adapted to generated fingerprints continuously for the protected device upon reception of network traffic purportedly coming from the protected device.

In a fifth preferred embodiment, the processor is adapted to generate decoy traffic for a plurality of protected devices, wherein the decoy traffic is generated using at least the features of the fingerprints of the plurality of protected devices so that fingerprint generated for the protected device by a further device in the network are at least similar.

In a sixth preferred embodiment, the interface is adapted to communicate using the 802.11 wireless protocol. It is advantageous that the processor is adapted to generate fingerprints from duration field values and to generate decoy traffic using different duration field values. In particular, it is preferred that the decoy traffic comprises at least one of probe request frames and null data frames.

In a second aspect, the invention is directed to a method of preventing fingerprint forgery attacks in a communication network. A device obtains a reference fingerprint, having a plurality of features, for a client device, generates and transmits decoy traffic for the client device, the decoy traffic comprising at least one frame having a feature that is different from the features of the reference fingerprint, generates a fingerprint from received network traffic that appears to come from the client device, comparing the generated fingerprint with the reference fingerprint to determine that the received network traffic comes from the client device in case of a match between the generated fingerprint and the reference fingerprint, and that the fingerprint of the received network traffic has been forged in case of a mismatch.

In a first preferred embodiment, the received network traffic has the network address of the client device as originating address.

In a second preferred embodiment, the communication network is a 802.11 network. It is advantageous that the fingerprints and the decoy traffic are generated using duration field values. It is further advantageous that the decoy traffic comprises at least one of probe request frames and null data frames.

BRIEF DESCRIPTION OF DRAWINGS

Preferred features of the present invention will now be described, by way of non-limiting example, with reference to the accompanying drawings, in which.

DESCRIPTION OF EMBODIMENTS

Figure 1:
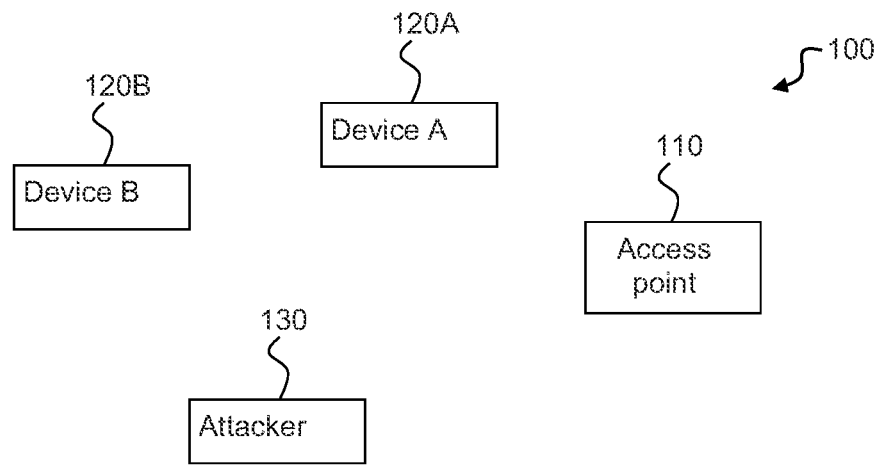
FIG. 1 illustrates an exemplary wireless network in which the present invention may be used.

FIG. 1 illustrates an exemplary wireless network 100 in which the present invention may be used. The wireless network 100 comprises a fingerprinting device, in the Figure exemplified by an access point (AP), 110, a plurality of client devices 120A-B (which may be jointly referred to as 120), and an attacker device 130, which also can act as a client device. The AP 110 is adapted to communicate with the client devices 120 and the attacker device 130 and, for example, provide Internet access to them. It should be noted that in the example, it is the AP 110 that prevents fingerprint forgery, but it could also be done by any other device in the network. Further in the example, it is assumed that one of the client devices 120 is the intended victim of the attacker 130.

A main idea of the present invention is to make it difficult or impossible for an attacker 130 to perform the first step of the fingerprinting forgery attack, i.e. when the attacker 130 analyses the network traffic of one or more client devices 120. To do so, the AP 110 generates decoy traffic that appears to be real traffic from client devices 120. More precisely, the AP 110 injects spoofed frames using the network addresses of the client devices 120. The attacker 130 fails to distinguish the spoofed frames from the real frames of the client devices 120. As will be seen below, the decoy traffic is preferably crafted such that when the attacker 130 imitates or replays the observed traffic, the attacker 130 either generates a signature that does not match the victim's signature, generates traffic with specific features (such as characteristic frames) that can be detected by the AP 110, or both of these cases.

In the first of these cases—non-matching fingerprint—the decoy traffic contains features that increase the distance between the attacker's generated signature and the victim's reference signature, which is known to the AP 110.

In the second of these cases—features detection—the decoy traffic also contains characteristic frames or sequence of frames specially crafted by the AP 110. The AP 110 is then able to use these characteristic frames or sequence of frames as proof of replay by the attacker 130: if the AP 110 detects such a characteristic frame purportedly coming from the victim, then the AP 110 knows that the attacker 130 has replayed this frame or at least that the characteristics of the frame has been reused. In addition, the AP 110 not only detects a fingerprint forgery attack, but also also identifies the victim that the attacker 130 had chosen for the attack. Before the replay, the AP 110 has no knowledge about which client device 120 the attacker 130 will choose for the attack.

Figure 2:
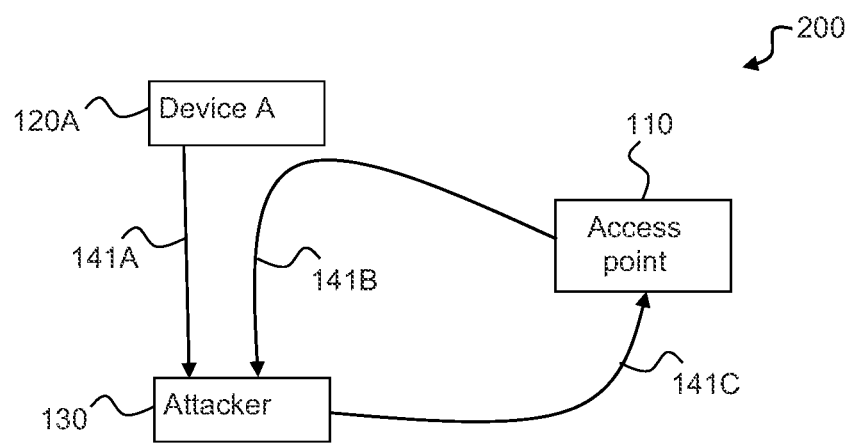
FIG. 2 illustrates insertion of decoy traffic and an attempted fingerprint spoofing attack in a network.

FIG. 2 illustrates insertion of decoy traffic and an attempted fingerprint spoofing attack in a network 200. The network 200 comprises the AP 110, a client device 120A ('victim') and an attacker 130.

As already mentioned, in order to forge a fingerprint of the victim 120A, the attacker 130 needs to analyse network traffic from the victim 130. The attacker 130 thus listens to real network traffic 141A transmitted by the victim 120A. However, unbeknownst to the attacker 130, the AP 110 transmits decoy traffic 141B that, to the attacker 130, appears to come from the victim 120A. The attacker's 130 analysis of the network traffic believed to be from the victim 120A will thus be performed on a combination of the real network traffic 141A and the decoy traffic 141B. It follows that the fingerprint generated by the attacker 130 is erroneous if the decoy traffic 141B is well crafted. Hence, when the attacker 130 generates imitation traffic 141C that is meant to look as though it comes from the victim 120A, the AP 110 is able to detect that a fingerprint generated from the imitation traffic 141C is different from a stored fingerprint for the client device 120A. The AP 110 may also detect replayed frames, as already described.

Figure 3:
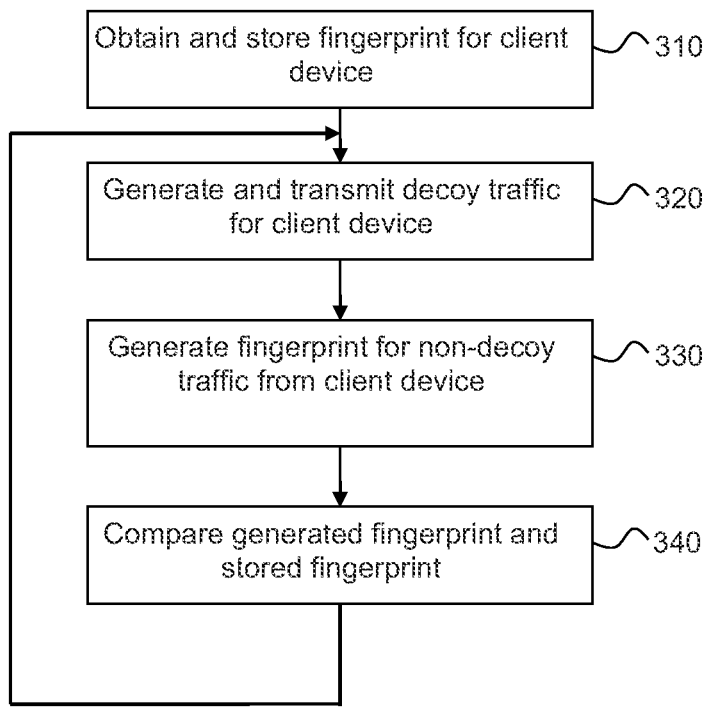
FIG. 3 illustrates a method for thwarting fingerprint attacks according to a preferred embodiment of the present invention.

It will thus be appreciated that the AP 110, as illustrated in FIG. 3, can detect fingerprint forgery by: obtaining and storing 310 a reference fingerprint for a client device 120A, generating and transmitting 320 decoy traffic for the client device 120A (in particular while the client device is in the network), generating 330 a fingerprint from received traffic that appears to come from the client device 120A (e.g. by checking the sender identity), and comparing 340 the generated fingerprint with the reference fingerprint. If there is a match, it can be determined, with a certain degree of certitude, that the network traffic comes from the client device 120A; if there is a mismatch, then it can be determined, with a certain degree of certitude (not necessarily the same as when the fingerprints match), that the network traffic really comes from the attacker 130 that tries to spoof the victim's fingerprint.

It should be noted that the AP 110 preferably generates fingerprints for client devices 120 in the network continuously. The AP 110 should then disregard the decoy traffic 141B when generating these fingerprints; otherwise, these fingerprints will be incorrect (and not match the reference fingerprints).

It should also be noted that it can be possible for the AP 110 to generate and send decoy traffic for a plurality of client devices 120 so that their fingerprints are identical (or at least very much alike) from the perspective of the attacker 130. Apart from protecting against fingerprint forgery attacks against all of these client devices 120, this can also protect the anonymity of the client devices 120.

It will be appreciated that while the description and the claims uses the expression "frame", this is intended to be a generic expression that covers not only "frames" of e.g. the 802.11 standard, but also other similar entities such as "packets".

Preferred Embodiment

In a preferred embodiment, the AP 110 is a 802.11 access point, while the victim 120A and the attacker 130 are 802.11 stations—the 802.11 standard has been identified in the background section of the present application. The fingerprinting method used is the method described by J. Cache in "Fingerprinting 802.11 Implementations via Statistical Analysis of the Duration Field", 2006, which builds a signature using the duration fields of frames sent by stations. This fingerprinting method can be attacked by the fingerprint forgery attack: the attacker analyses the duration fields used by the victim and sends traffic with similar durations while spoofing the victim's network address.

In the preferred embodiment, the AP 110 sends frames with durations that are not typically used by the victim. The AP 110 sends these frames using the MAC address of the victim as the emitting MAC address. It is preferred that the AP 110 generates at least one of two types of frames for the decoy traffic: probe request frames and null data frames. Typical durations on a real wireless card take discrete values such as {0, 36, 44, 48, 202, 314, . . . } microseconds. Sending decoy frames with fake duration values, such as 222 and 312 in the example, is sufficient to allow the differentiation between the forged fingerprint and the reference fingerprint of the victim. Moreover, the presence of frames with spoofed values like 222 and 312 is also proof that a station (here: the attacker) has replayed one or more frames.

It will be appreciated that it is advantageous to use probe request frames and/or null data frames since these frames do not imply a mandatory reply according to the 802.11 standard. The AP 110 can thus send such decoy frames without the need to send corresponding replies.

Frames that require a reply, e.g. data frames, can also be used, but the AP 110 should then in addition fake the appropriate answer, e.g. an acknowledgement. If this is not done, the attacker might suspect that decoy traffic is sent and restrain from replaying delays found in unanswered frames.

In order to generate and send decoy traffic for a plurality of client devices 120 so that their fingerprints are identical (or at least similar) from the perspective of the attacker 130, the AP 110 can use a mix of the duration values for all the client devices 120 when the decoy traffic is generated for a particular client device 120. In this context, similar means being sufficiently alike so that the attacker 130 cannot tell them apart with certainty.

It will also be appreciated that the decoy frames do not disturb the normal traffic of the wireless network, in particular if it is ascertained that the duration values used in the decoy frames do not exceed the range of usual values.

It should be noted that it is possible for an attacker to detect the use of the present invention if the AP 110 generates decoy traffic from the attacker. This might happen when the attacker is also a potential victim. However, this does not help the attacker to distinguish actual traffic from decoy traffic for another client device.

It will further be appreciated that an exact match between a stored fingerprint and a generated fingerprint is not always necessary or even possible. For example, if the possible duration values for a device are {0, 36, 44, 48, 202, 314} it is possible that only {0, 36, 44, 202, 314} are received if the sending device for some reason hasn't used the value 48. In these cases, fingerprints are considered to match if the 'distance' between them is sufficiently small. These considerations, well known to the skilled person, are however beyond the scope of the present invention.

Figure 4:
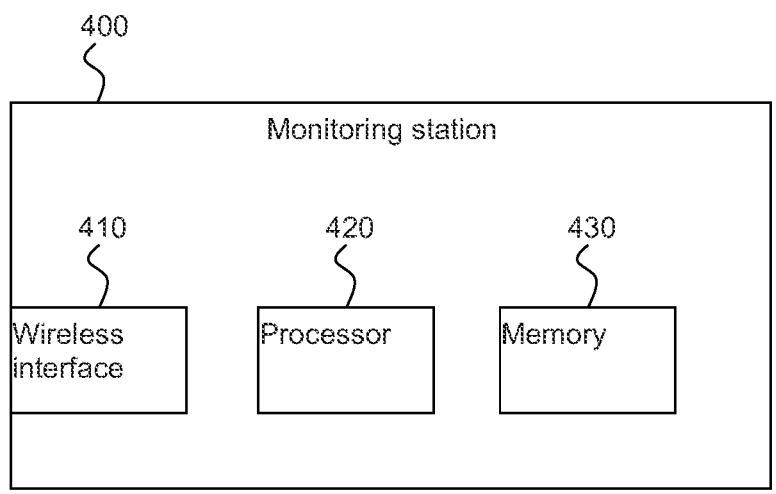
FIG. 4 illustrates an exemplary fingerprinting device according to a preferred embodiment of the present invention.

FIG. 4 illustrates an exemplary fingerprinting device according to a preferred embodiment of the present invention. The fingerprinting device 400 comprises a wireless interface 410, such as a 802.11 wireless card, at least one processor 420 (hereinafter "processor") and memory 430. The wireless interface 410 is adapted to receive wireless traffic and to insert decoy traffic, the processor 420 is adapted to fingerprint client devices based on received wireless traffic as already described, and the memory 430 is adapted to store data such as reference fingerprints of client devices. Only the features necessary for the comprehension of the invention are detailed; it will be understood that the fingerprinting device 400 further comprises internal connections and possibly, for example, a further (wire-based) communication interface and a user interface.

It will thus be appreciated that the present invention can provide a scheme for detecting and thwarting fingerprint forgery attacks. The present invention can be used without collaboration on the part of the client devices; in particular, it is not necessary to install any special software on the client devices. Further, any suitable wireless, and wired, devices can be protected. The invention can also be applied using different fingerprinting techniques, it can be used to increase the privacy in networks and it can be combined with techniques that increase fingerprint diversity.

Each feature disclosed in the description and (where appropriate) the claims and drawings may be provided independently or in any appropriate combination. Features described as being implemented in hardware may also be implemented in software, and vice versa. Reference numerals appearing in the claims are by way of illustration only and shall have no limiting effect on the scope of the claims.

The invention claimed is:

1. A device for countering fingerprint forgery attacks in a communication network, the device comprising:
 an interface configured to:
  receive network traffic from a plurality of devices in the communication network; and
  send decoy traffic in the communication network;
 a processor configured to:
  generate a fingerprint for a protected device based at least partially on an analysis of the received network traffic purportedly coming from the protected device;
  compare the generated fingerprint with a reference fingerprint associated with the protected device to determine whether the network traffic purportedly coming from the protected device originates from an attacker; and associate the decoy traffic with a network address associated with the protected device such that the decoy traffic appears to originate from the protected device, wherein the decoy traffic comprises at least one frame having a feature that is different from at least one feature of the reference fingerprint.

2. The device of claim 1, wherein the processor is further configured to detect a frame replay upon reception of a frame having a feature that is different from the features of the reference fingerprint.

3. The device of claim 1, wherein the processor is further configured to disregard the decoy traffic when generating a fingerprint for the protected device.

4. The device of claim 1, wherein the decoy traffic comprises the network address of the device as an originating address.

5. The device of claim 1, wherein the processor is further configured to generate fingerprints continuously for the protected device upon reception of network traffic purportedly coming from the protected device.

6. The device of claim 1, wherein the processor is configured to generate decoy traffic for a plurality of protected devices, wherein the decoy traffic is generated using at least the features of the fingerprints of the plurality of protected devices so that fingerprints generated for the protected devices by a further device in the network are at least similar.

7. The device of claim 1, wherein the interface is configured to communicate using an 802.11 wireless protocol.

8. The device of claim 7, wherein the processor is configured to generate fingerprints from duration field values and to generate decoy traffic using different duration field values.

9. The device of claim 7, wherein the decoy traffic comprises at least one of probe request frames and null data frames.

10. A method of preventing fingerprint forgery attacks in a communication network, the method comprising:
obtaining, by a device, a reference fingerprint, having a plurality of features, for a client device;
associating, by the device, decoy traffic with a network address associated with the client device such that the decoy traffic appears to originate from the client device;
transmitting, by the device, the decoy traffic, the decoy traffic comprising at least one frame having a feature that is different from the features of the reference fingerprint;
generating, by the device, a fingerprint from received network traffic that appears to come from the client device; and
comparing, by the device, features of the generated fingerprint with the features of the reference fingerprint to determine whether the received network traffic originates from the client device or an attacker.

11. The method of claim 10, wherein the received network traffic has the network address associated with the client device as an originating address.

12. The method of claim 10, wherein the communication network is an 802.11 network.

13. The method of claim 12, wherein the fingerprints and the decoy traffic are generated using duration field values.

14. The method of claim 12, wherein the decoy traffic comprises at least one of probe request frames and null data frames.

* * * * *